United States Patent
Huang et al.

(10) Patent No.: US 10,378,228 B2
(45) Date of Patent: Aug. 13, 2019

(54) POOL CLEANER

(71) Applicant: BESTWAY INFLATABLES & MATERIAL CORP., Shanghai (CN)

(72) Inventors: Shuiyong Huang, Shanghai (CN); Wenhua Hu, Shanghai (CN); Changde Wan, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 21 days.

(21) Appl. No.: 15/640,038

(22) Filed: Jun. 30, 2017

(65) Prior Publication Data

US 2018/0283027 A1 Oct. 4, 2018

(30) Foreign Application Priority Data

Mar. 31, 2017 (CN) .................... 2017 2 0337477 U (51) Int. Cl.
*E04H 4/16* (2006.01)
*C02F 1/00* (2006.01)
(Continued)

(52) U.S. Cl.
CPC .......... *E04H 4/1636* (2013.01); *B01D 29/21* (2013.01); *B01D 29/23* (2013.01); *B01D 29/56* (2013.01);
(Continued)

(58) Field of Classification Search
CPC ...... E04H 4/1636; B01D 29/56; B01D 29/90; B01D 35/05; B01D 35/301;
(Continued)

(56) References Cited

U.S. PATENT DOCUMENTS 3,616,918 A 11/1971 Diemond
4,043,917 A 8/1977 Rowley et al.
(Continued)

FOREIGN PATENT DOCUMENTS

DE 2231498 A1 8/1973
FR 2480340 A1 10/1981
(Continued)

OTHER PUBLICATIONS

European Search Report and Written Opinion from European Patent Application No. 17177668.5, 8 pages, Search completed Jan. 23, 2018.

*Primary Examiner* — Fred Prince
(74) *Attorney, Agent, or Firm* — AJ Moss; Dickinson Wright PLLC (57) ABSTRACT

A pool cleaner including a first filter assembly and a second filter assembly is provided in the present disclosure. The first filter assembly includes a first housing defining a first chamber, where the first housing is provided with a first water inlet and a first water outlet; and a first filter device disposed in the first chamber configured to perform a first filtration to water from the first water inlet. The second filter assembly includes a second housing defining a second chamber provided with a second water inlet, the second water inlet is connected with the first water outlet; and a second filter device disposed in the second chamber configured to perform a second filtration to the first filtered water. The first housing is detachably connected with the second housing. The pool cleaner in the present disclosure has a good filtering effect and is easy to disassemble.

48 Claims, 6 Drawing Sheets

(51) Int. Cl.
  *B01D 29/56* (2006.01)
  *B01D 29/90* (2006.01)
  *B01D 35/05* (2006.01)
  *B01D 35/30* (2006.01)
  *E04H 4/12* (2006.01)
  *B01D 29/21* (2006.01)
  *B01D 29/23* (2006.01)
  *C02F 103/42* (2006.01)

(52) U.S. Cl.
  CPC ............. *B01D 29/90* (2013.01); *B01D 35/05* (2013.01); *B01D 35/301* (2013.01); *C02F 1/001* (2013.01); *E04H 4/1263* (2013.01); *E04H 4/1272* (2013.01); *B01D 2201/301* (2013.01); *B01D 2201/40* (2013.01); *C02F 2103/42* (2013.01); *C02F 2201/004* (2013.01)

(58) Field of Classification Search
  CPC .......... B01D 2201/40; B01D 2201/301; C02F 1/001; C02F 2201/004; C02F 2103/42
  USPC ........ 210/167.16, 167.17, 232, 416.2; 15/1.7
  See application file for complete search history.

(56) References Cited

U.S. PATENT DOCUMENTS

| | | |
|---|---|---|
| 4,219,423 A | 8/1980 | Smith, Jr. |
| 4,325,150 A * | 4/1982 | Buddy .................. E04H 4/1272 137/578 |
| 4,348,281 A | 9/1982 | Perry et al. |
| 4,622,137 A | 11/1986 | Kessler |
| 4,725,352 A | 2/1988 | Haliotis |
| 5,035,811 A | 7/1991 | Grondin et al. |
| 5,143,605 A | 9/1992 | Masciarelli |
| 5,951,854 A | 9/1999 | Goldberg et al. |
| 6,701,542 B2 | 3/2004 | Marbach |
| 6,991,721 B2 | 1/2006 | Yuan |
| 7,060,182 B2 | 6/2006 | Erlich et al. |
| 7,101,475 B1 | 9/2006 | Maaske et al. |
| 7,815,795 B2 | 10/2010 | Parks et al. |
| 2013/0146106 A1* | 6/2013 | Erlich ...................... B08B 9/08 134/34 |

FOREIGN PATENT DOCUMENTS

| | | |
|---|---|---|
| FR | 2889458 A1 | 2/2007 |
| WO | WO 2004/109042 A2 | 12/2004 |
| WO | WO 2012/021935 A1 | 2/2012 |

* cited by examiner

POOL CLEANER

CROSS-REFERENCE TO RELATED APPLICATIONS

This application claims the benefit of priority to Chinese Patent Application No. 201720337477.8, titled "POOL CLEANER", filed on Mar. 31, 2017, the entire disclosure of which are incorporated herein by reference.

TECHNICAL FIELD

The present disclosure relates to a pool cleaner.

BACKGROUND

Wastes like leaves, debris and so on often fall into an outdoor swimming pool that is exposed to an atmosphere. Therefore, there is a need to regularly remove the wastes on a water surface of a swimming pool, to prevent wastes from sinking into a bottom of the swimming pool or being suspended in the water, which may affect cleaning of the swimming pool.

There are normally two ways to clean up the wastes on the water surface. The first one is to use a hand-held skimmer to clean up the wastes, which consumes plenty of physical strength, and is low in efficiency due to a long cleaning time needed. The second way is to use a motor-driven electric pool skimmer, however, the pool skimmer can only filter once via a filter basket or mesh having filter holes with large diameters, which also has a poor filter and cleaning effect.

SUMMARY

According to embodiments of the present disclosure, a pool cleaner that has a good filter effect and is easy to disassemble is provided to overcome aforementioned problems in a conventional technology.

The pool cleaner includes: a first filter assembly and a second filter assembly; the first filter assembly includes a first housing defining a first chamber, where the first housing is provided with a first water inlet and a first water outlet; and a first filter device disposed in the first chamber configured to perform a first filtration to water from the first water inlet; and the second filter assembly includes a second housing defining a second chamber, where the second housing is provided with a second water inlet, and the second water inlet is connected with the first water outlet; and a second filter device disposed in the second chamber configured to perform a second filtration to the first filtered water; where the first housing is detachably connected with the second housing.

In some embodiments, a bottom portion of the first housing is detachably connected with a side wall of the second housing via a first connector.

In some embodiments, the first water outlet is positioned at the bottom portion of the first housing; and the first connector includes: a first connection portion, protruding out of the side wall of the second housing, inserted through the first water outlet and extending into the first chamber, where the first connection portion is provided with a first through hole as the second water inlet; and a first limit portion, disposed in the first chamber, surrounding an outside of the first connection portion and coupled with the first connection portion by a screw-thread fit.

In some embodiments, at least an edge portion of the bottom portion of the first housing fits the side wall of the second housing along a circumferential direction of the first housing.

In some embodiments, diameters of filter holes of the first filter device are greater than diameters of filter holes of the second filter device.

In some embodiments, the pool cleaner further includes: a water pump, communicated with the second chamber; and a third housing defining a third chamber configured to receive the water pump.

In some embodiments, the water pump is provided with a water inlet pipe and a water outlet pipe; and the water pump is communicated with the second chamber via the water inlet pipe, and the second filtered water flows into the water pump via the water inlet pipe and is drained out of the third chamber via the water outlet pipe.

In some embodiments, an outlet is disposed on the third housing, and water flowing from the water outlet pipe flows out of the third chamber through the outlet.

In some embodiments, at least one drain hole is disposed on the third housing, and the at least one drain hole is spaced from the outlet.

In some embodiments, the second housing and the third housing are integrally formed, the second chamber and the third chamber are separated by a separator, a second through hole is disposed on the separator, and the water inlet pipe is inserted through the second through hole and extends into the second chamber.

In some embodiments, the water inlet pipe is detachably connected with the separator via a second connector.

In some embodiments, the second connector includes: a second connection portion, disposed on the water inlet pipe and inserted through the second through hole and extending into the second chamber; and a second limit portion, disposed in the second chamber, surrounding an outside of the second connection portion and coupled with the second connection portion by a screw-thread fit.

In some embodiments, the first housing, the second housing and the third housing are arranged in a way to make: a water flow direction from the first chamber to the second chamber is perpendicular to a water flow direction from the second chamber to the third chamber.

In some embodiments, the pool cleaner further includes a first end cap and a second end cap; wherein the first end cap is coupled to an end of the second housing away from the third housing, and the second end cap is coupled to an end of the third housing away from of the second housing.

In some embodiments, the second filter device includes a filter element configured to perform the second filtration to the first filtered water; the second chamber is partitioned to a first inner chamber and a second inner chamber by the filter element; and the second water inlet is communicated with the first inner chamber, the second inner chamber is communicated with the water pump, and the first filtered water firstly flows into the first inner chamber and then flows into the second inner chamber through the filter element.

In some embodiments, the filter element includes a filter cartridge, a space between the filter cartridge and the second housing is the first inner chamber, and a space inside the filter cartridge is the second inner chamber; and the water inlet pipe is at least partially positioned within the second inner chamber.

In some embodiments, the first filter device includes a filter basket, and the filter basket is provided with a plurality of filter holes and configured to perform the first filtration.

In some embodiments, the first filter assembly further includes a floating weir, and the floating weir includes: a hollow tubular structure; and a flange, having an annular shape and a cross section in a downward curved arc shape, and an outer edge of the flange being connected with an upper end of the hollow tubular structure; where the hollow tubular structure is disposed between the first chamber and the filter basket.

In some embodiments, the first filter assembly further includes a limit portion, and an outer edge of the limit portion is connected with the first water inlet to limit the floating weir within the first chamber.

In some embodiments, the first filter device further includes a filter pad disposed within the filter basket; and the filter pad has a porous structure, and diameters of holes in the filter pad are smaller than diameters of the plurality of filter holes of the filter basket.

In some embodiments, the pool cleaner further includes a hook component connected with the first housing.

In some embodiments, the hook component includes: a base, connected with a side wall of the first housing; and a hook portion, one end of the hook portion being connected with the base.

In some embodiments, the hook portion is configured to move on the base to change a mounting position of the hook portion; and at the mounting position, the hook portion is fixedly connected with the base.

In some embodiments, the hook portion includes: a first hook leg portion, a second hook leg portion and a third connection portion, where two ends of the third connection portion are respectively connected with the first hook leg portion and the second hook leg portion, at least one of the first hook leg portion and the second hook leg portion is detachably connected with the third connection portion, and the hook portion is connected with the base via the first hook leg portion and configured to move on the base to change the mounting position.

In some embodiments, at least one of the first hook leg portion and the second hook leg portion is movably connected with the third connection to change a distance between the first hook leg portion and the second hook leg portion.

In some embodiments, the second hook leg portion is provided with a fastener.

In some embodiments, the pool cleaner further includes a floating component, connected with the first housing configured to keep the pool cleaner floating on a water surface.

In some embodiments, the floating component includes a floating portion and a connection rod, two ends of the connection rod are connected with the floating portion and the first housing respectively, and the floating portion is filled with a foam material.

Compared with the conventional technology, the present disclosure has the following advantages.

In the pool cleaner according to an embodiment of the present disclosure, a first filter device is disposed within the first chamber and configured to perform the first filtration to wastes on a water surface, and a second filter device is disposed in the second chamber and configured to perform the second filtration to the first filtered water, so that the cleaning effect can be improved.

In particular, the first housing is detachably connected with the second housing. On one hand, a user can separate the first housing and the second housing for storage, avoiding the large pool cleaner occupying a large space. On the other hand, when the user need to maintain the pool cleaner, it is easy to clean wastes on the first filter device and wastes on the second filter device respectively by separating the first housing from the second housing. When the first housing and the second housing are connected with each other, a whole length of the pool cleaner is short, which may shorten a height of the pool cleaner to some extent. The pool cleaner in the present disclosure can not only be applied to a deep water pool, but also be applicable for a shallow water pool. Therefore, such arrangement of the pool cleaner can reduce a limitation of the shallowest depth of a water pool where the pool cleaner can be applied, and thus improve an application range of the product.

Therefore, the wastes in each chamber can be easily removed, making the pool cleaner convenient for use.

Moreover, when one of the first filter device and the second filter device is damaged, it is easy to separate the first housing from the second housing, and remove the damaged filter device for repair or replacement. Since the chamber where the damaged filter device is positioned is short, it is easy to replace the damaged filter device, that is, the assembling operation and the disassembling operation are simplified.

Furthermore, when the first housing or the second housing is damaged, it is easy to separate the two housings, and replace the damaged housing. Therefore, compared with the conventional technology, the present disclosure may bring in assembly and disassembly convenience and have a low maintenance cost.

In some embodiments, diameters of filter holes of the first filter device are greater than diameters of filter holes of the second filter device. The first filter device may perform a first filtration to wastes of large volumes, such as leaves. The second filter device may perform a second filtration to wastes of small volumes to obtain a better filtration effect. Moreover, after the first filtration, the wastes of large volumes are filtered out so that the wastes of large volumes will not stack on the second filter device, which can prevent the wastes of large volumes from blocking the second filter device. Therefore, a cycle of cleaning, maintenance or replacement of the second filter device can be greatly extended.

In some embodiments, the pool cleaner includes a water pump and a third housing defining a third chamber, where the third chamber is configured to housing the water pump. The technical proposal of integrating the water pump in the pool cleaner in the present disclosure makes the water pump adaptive to the product better, thereby avoiding a user to find a separate water pump to cooperate with the pool cleaner, which can bring convenience to the user. In use, the user does not need to prepare the water pump separately, instead the user only need to place the pool cleaner in a water pool, and connect the water pump with a power supply to drive operation of the water pump. In other embodiments, the pool cleaner may not include the water pump, and the user may prepare a water pump separately and connect the pool cleaner with the prepared water pump to filter the water in a pool, which may reduce a purchase cost for some users.

In some embodiments, the first filter assembly includes a hook component that allows the user to hang and fix the pool cleaner on a wall of a swimming pool to prevent the pool cleaner from swinging.

In some embodiments, the hook portion is configured to move on the base to change a mounting position of the hook portion, which can realize adjusting the first housing to an appropriate height according to a level of the water surface.

In some embodiments, the pool cleaner further includes a floating component, connected with the first housing and configured to keep the pool cleaner floating on a water surface and allow the pool cleaner to float freely on the water surface, which can expand a clean area of the pool cleaner and improve the cleaning effect.

DETAILED DESCRIPTION

In order to make the above-mentioned objects, features and advantages of the present disclosure more easily understood, specific embodiments of the present disclosure will be described in detail with reference to the accompanying drawings.

Figure 1:
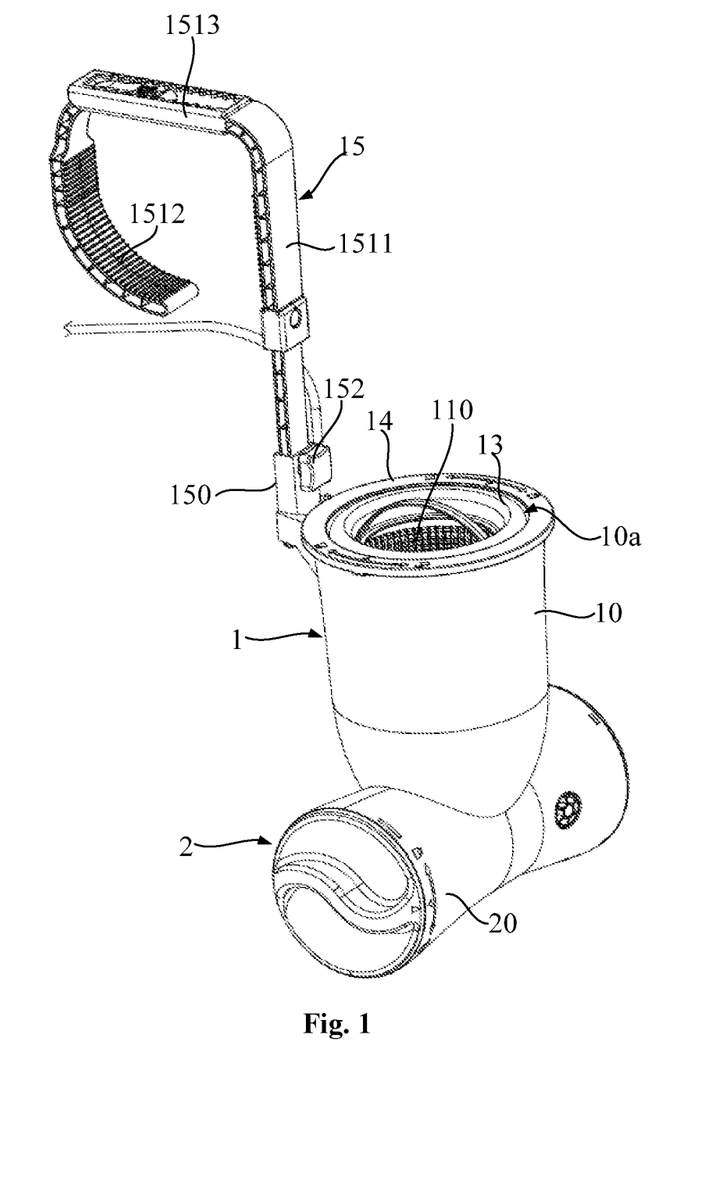
FIG. 1 schematically illustrates a stereogram of a pool cleaner according to an embodiment of the present disclosure.
Figure 2:
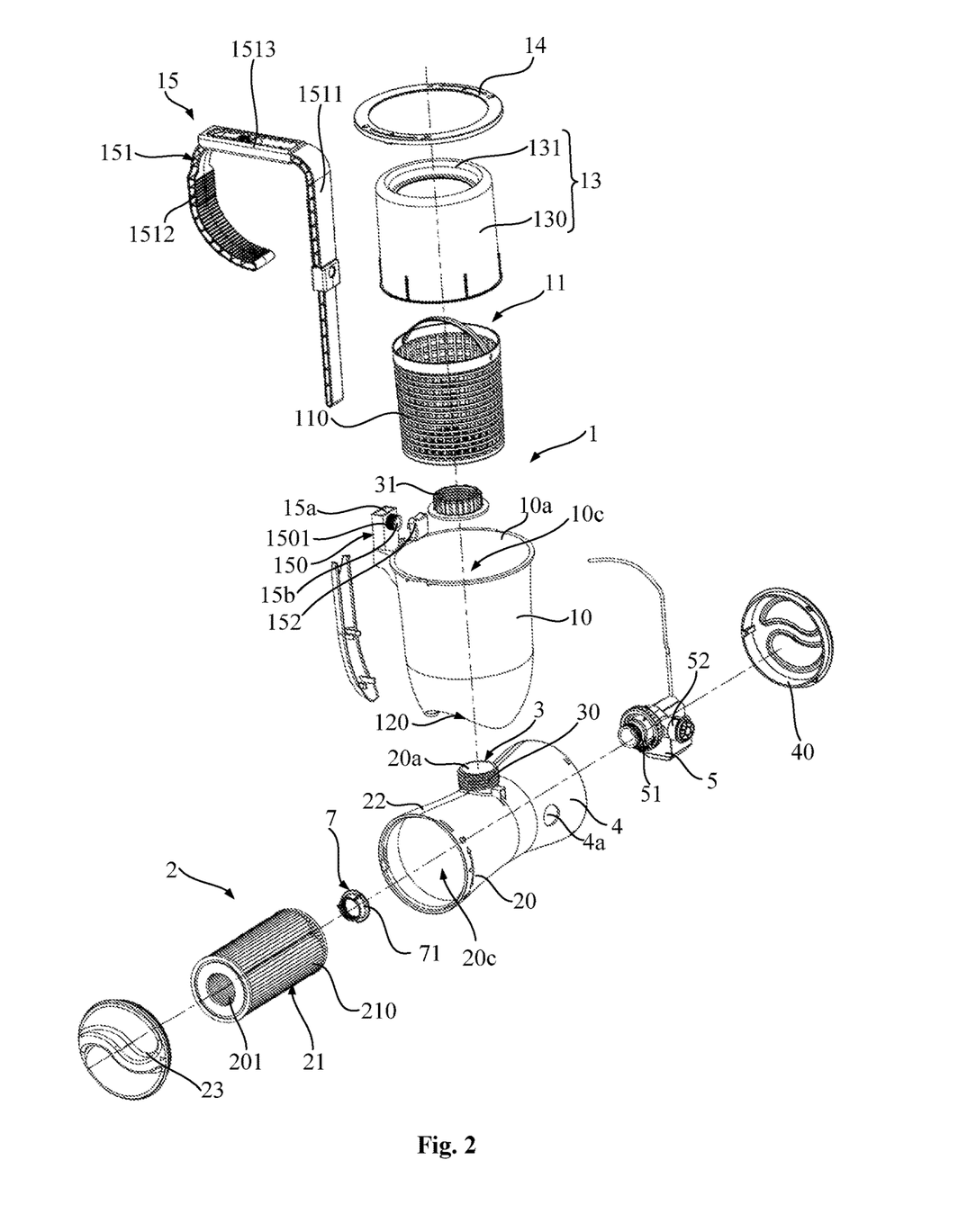
FIG. 2 schematically illustrates an exploded view of a pool cleaner according to an embodiment of the present disclosure.
Figure 3:
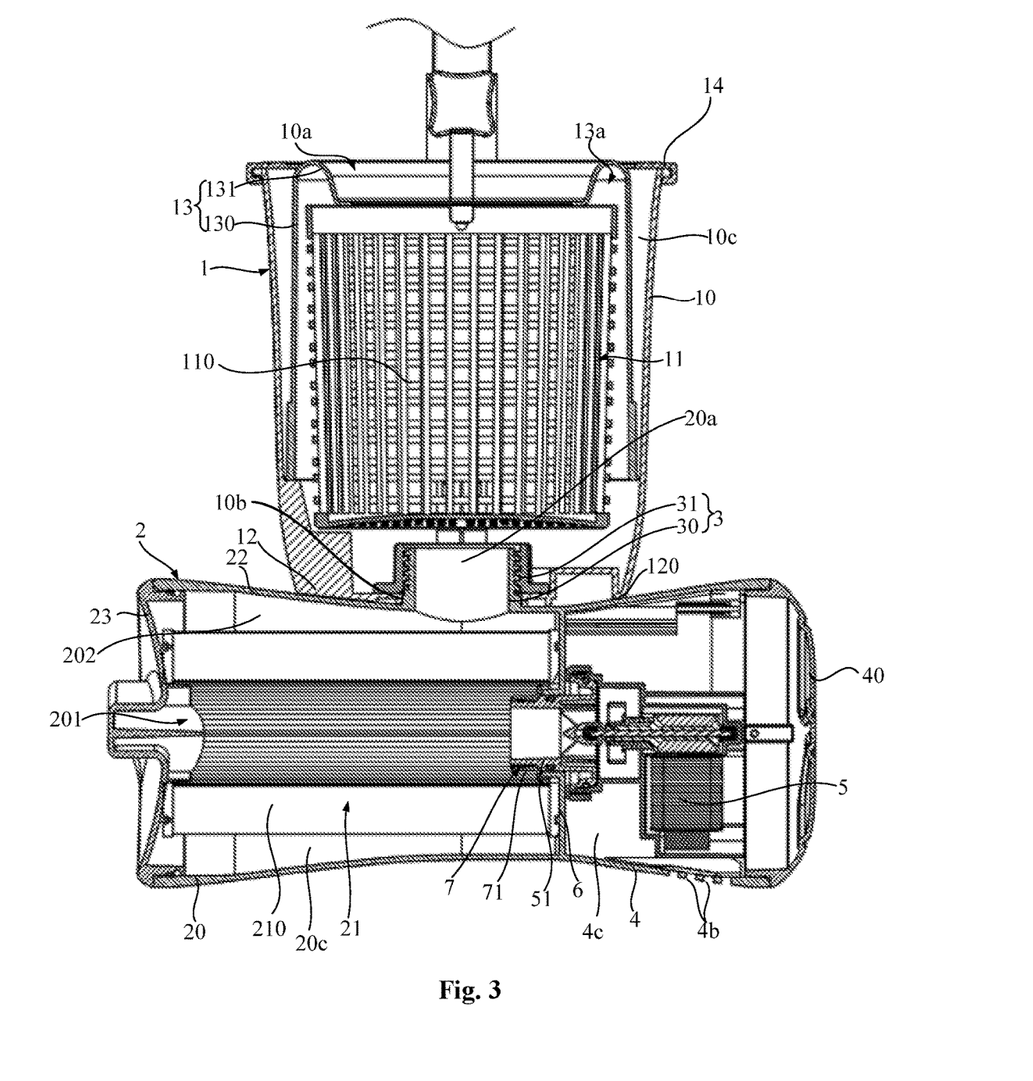
FIG. 3 schematically illustrates a cross-sectional view of a pool cleaner according to an embodiment of the present disclosure, where a central axis of a first chamber and a central axis of a second chamber define a section of the cross-sectional view.

A pool cleaner is provided according to an embodiment of the present disclosure. Referring to FIGS. 1 to 3, the pool cleaner may include a first filter assembly 1 and a second filter assembly 2.

The first filter assembly 1 includes a first housing 10 defining a first chamber 10c (not shown in FIG. 1) and a first filter device 11.

The first housing 10 is provided with a first water inlet 10a and a first water outlet 10b (shown in FIG. 3), where the first water inlet 10a is configured to introduce water into the first chamber 10c.

The first filter device 11 is disposed in the first chamber 10c and configured to perform a first filtration to the water that flows into the first chamber 10c from the first water inlet 10a.

The second filter assembly 2 includes a second housing 20 defining a second chamber 20c (not shown in FIG. 1) and a second filter device 21.

The second housing 20 is provided with a second water inlet 20a, where the second water inlet 20a is connected with the first water outlet 10b so that the first filtered water can flow into the second chamber 20c.

The second filter device 21 is received in the second chamber 20c and configured to perform a second filtration to the first filtered water.

The first housing 10 is detachably connected with the second housing 20.

When using the pool cleaner in the present disclosure, it is possible to dispose the first water inlet 10a to be flush with a water surface or slightly lower than the water surface. The second housing 20 is connected with a water pump 5, and the water pump 5 can provide suction to draw water from the first water inlet 10a into the first chamber 10c and the second chamber 20c successively, so that the water can be sequentially filtered by the first filter device 11 and the second filter device 21 to remove wastes on the water surface.

Compared with the conventional technology, the first filter device 11 is disposed in the first chamber 10c to perform the first filtration to the wastes, and the second filter device 21 is disposed in the second chamber 20c to perform the second filtration to the wastes, which can enhance the cleaning effect.

In particular, the first housing 10 is detachably connected with the second housing 20. On one hand, a user can separate the first housing 10 and the second housing 20 for storage, avoiding the large pool cleaner occupying a large space. On the other hand, when the user need to maintain the pool cleaner, it is easy to clean wastes on the first filter device 11 and wastes on the second filter device 21 respectively by separating the first housing 10 from the second housing 20. When the first housing 10 and the second housing 20 are connected with each other, a whole length of the pool cleaner is short, which may shorten a height of the pool cleaner to some extent. The pool cleaner in the present disclosure can not only be applied to a deep water pool, but also be applicable for a shallow water pool. Therefore, such arrangement of the pool cleaner can reduce a limitation of the shallowest depth of the water pool where the pool cleaner can be applied, and thus improve an application range of the product.

Moreover, when one of the first filter device 11 and the second filter device 21 is damaged, it is easy to separate the first housing 10 from the second housing 20, and remove the damaged filter device for repair or replacement. Since the chamber where the damaged filter device is positioned is short, it is easy to replace the damaged filter device, that is, the assembly operation and the disassembling operation are simplified.

Furthermore, when the first housing 10 or the second housing 20 is damaged, it is easy to separate the two housings and replace the damaged housing. Therefore, compared with the conventional technology, the present disclosure brings in assembly and disassembly convenience and has a low maintenance cost.

Referring to FIGS. 2 and 3, a bottom portion 12 of the first housing 10 may be detachably connected with a side wall 22 of the second housing 20 via a first connector 3. On one hand, the first housing 10 can be fixedly connected with the second housing 20 via the first connector 3. On the other hand, the first housing 10 and the second housing 20 can be separated by releasing the first connector 3.

The first water outlet 10b (shown in FIG. 3) may be disposed at the bottom portion 12 of the first housing 10. The first connector 3 may include a first connection portion 30 and a first limit portion 31.

The first connection portion 30 is disposed on the side wall 22, protruding out of the side wall 22, inserted through the first water outlet 10b and extends into the first chamber 10c. The first connection portion 30 is provided with a first through hole as the second water inlet 20a, and an external thread may be disposed on an outer surface of the first connection portion 30.

The first limit portion 31 is disposed in the first chamber 10c, surrounds an outside of the first connection portion 30, and is coupled with the first connection portion 30 by a screw-thread fit.

During an assembling process, the first connection portion 30 is inserted through the first water outlet 10b and the first limit portion 31 is screwed on the first connection portion 30 in the first chamber 10c. Meanwhile, the first limit portion 31 may abut against the first housing 10, so that the first housing 10 is fixedly connected with the second housing 20. During a disassembly process, the first filter device 11 may be firstly removed, and then the first limit portion 31 may be removed in the first chamber 10c to separate the first housing 10 from the second housing 20. Where, the first connection portion 30 may be a screw, and the first limit portion 31 may be a nut.

At least an edge portion 120 of the bottom portion 12 of the first housing 10 fits the side wall 22 of the second housing 20 along a circumferential direction of the first housing 10. The circumferential direction of the first housing 10 is a direction that surrounds a central axis of the first housing 10. On one hand, the first housing 10 and the second housing 20 in the present disclosure are connected securely. On the other hand, the pool cleaner has a compact and artistic appearance.

Figure 4:
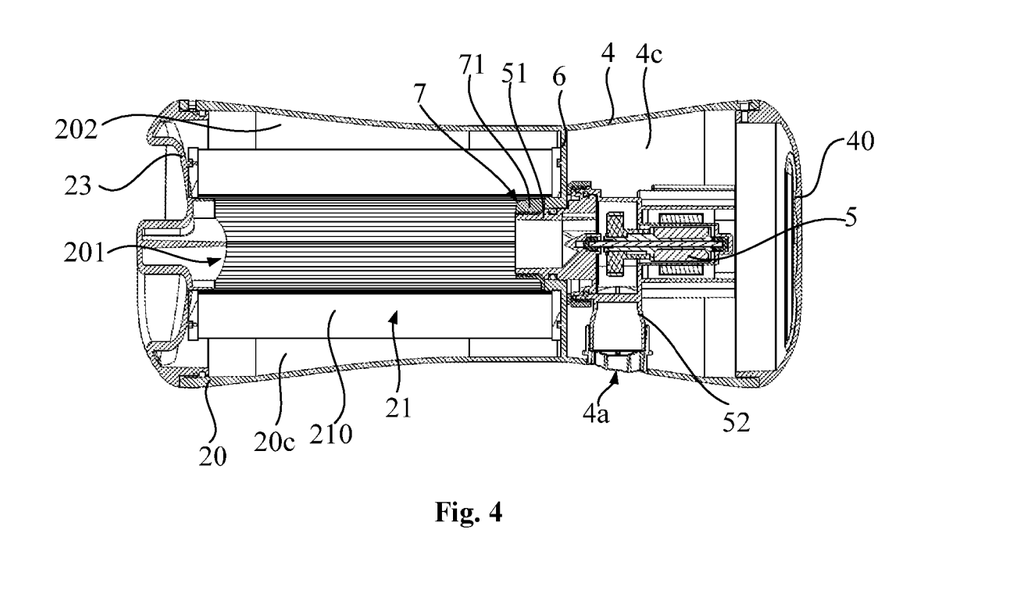
FIG. 4 schematically illustrates a cross-sectional view of the second housing and a third housing of the pool cleaner shown in FIG. 1, where the cross section crosses a central axis of the second chamber and is perpendicular to a central axis of the first chamber.

In order to make application of the pool cleaner more convenient, with reference to FIGS. 2-4, the pool cleaner may also include a water pump 5 and a third housing 4.

The water pump 5 is communicated with the second chamber 20c. In some embodiments, the water pump 5 is configured to drain the second filtered water.

The third housing 4 defines a third chamber 4c (not shown in FIG. 2) and is configured to receive the water pump 5.

Therefore, the water pump 5 can be integrated in the pool cleaner so that the water pump 5 can be adaptive to the pool cleaner better, thereby avoiding a user to find a water pump separately to match with the pool cleaner and bringing convenience to the user. In use, the user does not need to prepare the water pump separately, instead only needs to place the pool cleaner in a water pool, and connect the water pump 5 with a power supply to drive operation of the water pump 5. In other embodiments, the pool cleaner may not include the water pump, and the user may prepare a water pump separately and connect the pool cleaner with the prepared water pump to filter the water in the pool, which may reduce a purchase cost for some users.

In some embodiments, the water pump 5 is provided with a water inlet pipe 51 and a water outlet pipe 52 as shown in FIG. 2.

The water pump 5 is communicated with the second chamber 20c via the water inlet pipe 51, and the second filtered water flows into the water pump 5 via the water inlet pipe 51 and is drained out of the third chamber 4c via the water outlet pipe 52.

When the water pump 5 is started, the water pump 5 can provide suction, to draw water on a water surface to flow through the first water inlet 10a, the first chamber 10c, the first water outlet 10b, the second water inlet 20a, the second chamber 20c, the water inlet pipe 51, the water pump 5 and the water outlet pipe 52 until being discharged. The water pump 5 is received in the third chamber 4c, and the third housing 4 may protect the water pump 5 to some extent.

An outlet 4a is disposed on the third housing 4 (not shown in FIG. 3), where the outlet 4a corresponds to the water outlet pipe 52, so that water from the water outlet pipe 52 can flow out of the third chamber 4c via the outlet 4a. In some embodiments, the water outlet pipe 52 may be inserted through the outlet 4a, or in other embodiments, the water outlet pipe 52 may be directly aligned with the outlet 4a, to ensure that the water can be directly and effectively discharged.

The third housing 4 may also be provided with at least one drain hole 4b (not shown in FIGS. 2 and 4), and the at least one drain hole 4b is spaced from the outlet 4a. When the pool cleaner starts work, the second housing 20 and the third housing 4 are firstly placed in a water pool, and water in the water pool can flow into the third chamber 4c from the at least one drain hole 4b to vent air from the third chamber 4c, which may facilitate the pool cleaner diving.

In the present disclosure, the second housing 20 and the third housing 4 may be integrally formed, and the second housing 20 and the third housing 4 may be separated from each other by a separator 6. A second through hole may be disposed on the separator 6 (the second through hole is not visible in FIGS. 3 and 4 since the water inlet pipe 51 is inserted through the second through hole), and the water inlet pipe 51 may be inserted through the second through hole and extends into the second chamber 20c.

The second housing 20 and the third housing 4 are integrally molded, and only one mold is needed in manufacture, thus the manufacturing process is simplified. Specifically, the separator 6 may be a partition plate.

Where, the water inlet pipe 51 and the separator 6 are detachably connected via a second connector 7. As such, when the water pump 5 needs to be replaced or repaired, the second connector 7 can be dismounted to make the water pump 5 separated from the separator 6. Further, the user can store the water pump 5 separately as necessary.

In some embodiments, the second connector 7 may include a second connection portion and a second limit portion 71. The second connection portion is disposed on the water inlet pipe 51, inserted through the second through hole of the separator 6 and extends into the second chamber 20c. For example, the second connection portion may be an outer thread formed at an end portion of the water inlet pipe 51, where the end portion extends into the second chamber 20c.

The second limit portion 71 is disposed in the second chamber 20c, surrounds an outside of the second connection portion and is coupled with the second connection portion by a screw-thread fit.

During an installation process, when the water inlet pipe 51 is inserted through the second through hole of the separator 6 and extends into the second chamber 20c, and the second limit portion 71 is screwed on the water inlet pipe 51 in the second chamber 20c, the second limit portion 71 abuts against the separator 6 in an axial direction so that the water pump 5 can be fixedly connected with the separator 6. When the water pump 5 needs to be dismounted, the second limit portion 71 can be screwed off. Where, the second connection portion may also be an axle sleeve fixed to an outside of the water inlet pipe 51, and an external thread is disposed on the axle sleeve. The second limit portion 71 may be a nut.

Further, the first housing 10, the second housing 20 and the third housing 4 may be arranged in a way to make: a water flow direction from the first chamber 10c to the second chamber 20c is perpendicular to a water flow direction from the second chamber 20c to the third chamber 4c. Specifically, the water flow direction from the first chamber 10c to the second chamber 20c may be vertical, and the water flow direction from the second chamber 20c to the third chamber 4c may be horizontal, which to some extent can shorten a height of the pool cleaner. The pool cleaner in the present disclosure can not only be applied to a deep water pool, but also be applicable for a shallow water pool. Therefore, such arrangement of the pool cleaner can reduce a limitation of the shallowest depth of the water pool where the pool cleaner can be applied, and thus enlarge an application range of the product.

In some embodiments, the pool cleaner may further include a first end cap 23 and a second end cap 40, where the first end cap 23 may be coupled to an end of the second housing 20 away from the third housing 4, and the second end cap 40 may be coupled to an end of the third housing 4 away from the second housing 20. The first end cover 23 and the second end cover 40 respectively are used to seal the second housing 20 and the third housing 4, when the second housing 20 and the third housing 4 are integrally formed. A user may open the first end cap 23 to take the second filter device 21 out for cleaning and maintenance, or open the second end cap 40 to take the water pump 5 out for cleaning or maintenance without damaging the second housing 20 and the third housing 4 themselves.

The second filter device 21 may include a filter element 210, where the second filter device 21 performs the second filtration to the first filtered water by the filter element 210; the second chamber 20c is partitioned to a first inner chamber 202 and a second inner chamber 201 by the filter element 210; and the second water inlet 20a is communicated with the first inner chamber 202, the second inner chamber 201 is communicated with the water inlet pipe 51, and the first filtered water flows into the first inner chamber 202 and is filtered by the filter element 210, and then flows into the second inner chamber 201.

Diameters of filter holes of the filter element 210 may be smaller than diameters of filter holes of the first filter device 11, so that the diameters of the filter holes of the first filter device 11 can be larger than the diameters of the filter holes of second filter device 21. The first filtration may be a coarse filter, and the first filter device 11 may perform the first filtration to wastes of large volumes, such as leaves. The filter element 210 may perform a second filtration to wastes of small volumes to obtain a better filtration effect. Moreover, after the first filtration, the wastes of large volumes are filtered out so that the wastes of large volumes will not stack on the filter element 210, which can prevent the wastes of large volumes from blocking the filter element 210. Therefore, a cycle of cleaning, maintenance or replacement of the second filter device 21 can be greatly extended.

In some embodiments, the filter element 210 may include a filter cartridge, a space between the filter cartridge and the second housing 20 serves as the first inner chamber 202, and a space inside the filter cartridge serves as the second inner chamber 201; and the water inlet pipe 51 is at least partially positioned within the second inner chamber 201. The filter cartridge may include an annular filter mesh or an annular filter fabric which defines a second inner chamber 201, where the annular filter fabric may include a non-woven fabric or a polyester fiber. Specifically, the filter cartridge may be in a hollow cylindrical shape, and a connection relationship between the filter cartridge and the water pump 5 is described as follows.

One end of the filter cartridge facing the third chamber 4c in an axial direction may be sleeved outside the second limit portion 71. During assembly, the water inlet pipe 51 is connected with the separator 6 firstly, and then the filter element 210 is inserted into the second chamber 20c and the one end of the filter cartridge is sleeved outside the second limit portion 71. In addition to a structure of the filter cartridge described above, the filter element 210 may also be a filter plate, and the second chamber 20c is partitioned to two inner chambers along an axial direction of the second chamber 20c by the filter plate.

Referring to FIGS. 2 and 3, the first filter device 11 may include a filter basket 110.

The filter basket 110 is provided with a plurality of filter holes and configured to perform the first filtration. Diameters of the plurality of filter holes of the filter basket 110 may be larger than diameters of filter holes of the filter element 210.

The filter basket 110 may be applied to filter wastes of large volumes, such as leaves and so on. When the pool cleaner is driven by the water pump 5, water enters the filter basket 110 from the first water inlet 10a and flows into the first chamber 10c, where the wastes can remain inside the filter basket 110. The diameters of the plurality of filter holes of the filter basket 110 are larger than the diameters of filter holes of the filter element 210, so that the filter basket 110 can perform a coarse filtration to water on a water surface, while the filter element 210 can perform a fine filtration to the water filtered by the filter basket 110 and filter out some wastes of small volumes.

In some embodiments, the first filter device 11 may further include a filter pad (not shown in the Figs.) disposed within the filter basket 110 and covering a bottom surface of the filter basket 110. The filter pad has a porous structure, and diameters of holes in the filter pad are smaller than diameters of the plurality of filter holes of the filter basket 110, so that the filter pad can filter wastes of small volumes to improve cleaning effect of the first filtration. In structure, the first filter assembly 1 may further include a floating weir 13 in the first chamber 10c. The floating weir 13 may include a hollow tubular structure 130 and a flange 131. The hollow tubular structure 130 extends along an axial direction of the hollow tubular structure 130.

The flange 131 is in an annular shape and has a cross section in a downward curved arc shape, and an outer edge of the flange 131 is connected with an upper end of the hollow tubular structure 130.

The hollow tubular structure 130 is disposed in the first chamber 10c and between the first housing 10 and the filter basket 110. The filter basket 110 is disposed inside the hollow tubular structure 130 and abuts against the flange 131 along an axial direction of the floating weir 13.

The floating weir 13 can be axially abutted against the filter basket 110 via the flange 131, allowing water to flow from the first water inlet 10a into the filter basket 110. As shown in FIG. 3, the flange 131 has a cross section in a downwardly curved arc shape so that a groove 13a is formed in the flange 131. There is some air retained in the groove 13a to keep the floating weir 13 with a certain buoyancy. When there are waves on a water surface, the waves can drive the floating weir 13 to swing, which may facilitate the fluctuant water on the water surface flowing into the floating weir 13 from the first water inlet 10a and thus flowing into the filter basket 110.

Referring to FIGS. 1 to 3, the first filter assembly 1 may further include a limit portion 14.

The limit portion 14 has an annular structure, where an outer edge of the limit portion 14 is connected with the first water inlet 10a to limit the floating weir 13 within the first chamber 10c. The limit portion 14 has a blocking effect on the floating weir 13 to prevent the floating weir 13 from moving upward and out of the first chamber 10c, thereby further limiting the filter basket 110.

The limit portion 14 may be a retaining ring which abuts against the floating weir 13 along a circumferential direction. There may be no gap or a very small gap between the retaining ring and the floating weir 13, so that most of the wastes can be filtered by the filter basket 110.

With reference to FIGS. 1 and 2, the pool cleaner may further include a hook component 15 connected with the first housing 10. With the hook component 15, the pool cleaner can be hung on a wall of a pool to prevent the pool cleaner from swinging.

The hook component 15 may include a base 150 and a hook portion 151, where the base 150 is connected with a side wall of the first housing 10.

One end of the hook portion 151 is connected with the base 150. The hook component 15 may be hung on a wall of a pool via the hook portion 151.

The hook portion 151 is configured to move on the base 150 to change a mounting position of the hook portion 151, and at the mounting position, the hook portion 151 is fixedly connected with the base 150. When a level of a water surface changes, the mounting position of the hook portion 151 on the base 150 can be adjusted according to a distance between the water surface and a top edge of a pool wall, so that the first water inlet 10a can be flush with the water surface or slightly lower than the water surface.

In some embodiments, there are a plurality of mounting positions of the hook portion 151 which may be achieved in the following ways. Specifically, an insert hole 15a is disposed on the base 150, a mounting portion 1501 with external thread is disposed on a side wall of the base 150, a mounting hole 15b is disposed in the mounting portion 1501, and the insert hole 15a is communicated with the mounting hole 15b; and a locating portion 152 is configured to be coupled with the mounting portion 1501 by a screw-thread fit. The locating portion 152 may include a locating pin (not visible in FIG. 2), and when the locating portion 152 is screwed on the mounting hole 15b, the locating pin is inserted into the mounting hole 15b.

During assembling, a first hook leg portion 1511 of the hook portion 151 may be inserted into the insert hole 15a until the first hook leg portion 1511 reaches a certain mounting position, then the locating portion 152 and the mounting portion 1501 are tightened up, the locating pin is inserted through the mounting hole 15b and abuts on the first hook leg portion 1511, thus the first hook leg portion 1511 is clamped and fixed therein. When the mounting position needs to be adjusted, the locating portion 152 may be unscrewed to separate the locating pin from the first hook leg portion 1511, the first hook leg portion 1511 can be moved up and down to a desired mounting position, and then the locating portion 152 is screwed again to be fixedly connected with the mounting portion 1501.

The hook portion 151 may include the first hook leg portion 1511, a second hook leg portion 1512, and a third connection portion 1513. Two ends of the third connection portion 1513 are respectively connected with the first hook leg portion 1511 and the second hook leg portion 1512, and at least one of the first hook leg portion 1511 and the second hook leg portion 1512 is detachably connected with the third connection portion 1513. In some embodiments, the second hook leg portion 1512 is detachably connected with the third connection portion 1513. In some embodiments, the first hook leg portion 1511 is detachably connected with the third connection portion 1513. In other embodiments, both the first hook leg portion 1511 and the second hook leg portion 1512 are detachably connected with the third connection portion 1513. The hook portion 151 is connected with the base 150 via the first hook leg portion 1511 and configured to move on the base 150 to change the mounting position.

The second hook leg portion 1512 is detachably connected with the third connection portion 1513, so that the hook portion 151 can be hung on a pool wall and removed from the pool wall, making the pool cleaner convenient for use.

In some embodiments, at least one of the first hook leg portions 1511 and the second hook leg portion 1512 is movably connected with the third connection portion 1513. Specifically, the second hook leg portion 1512 may be movably connected with the third connection portion 1513, or the first hook leg portion 1511 is movably connected with the third connection 1513, or both the first hook leg portion 1511 and the second hook leg portion 1512 are movably connected with the third connection 1513, so as to change a spacing between the first hook leg portion 1511 and the second hook leg portion 1512, which can be adaptive to pool walls with different thickness, and meet clamping requirements of different pool walls.

Figure 5:
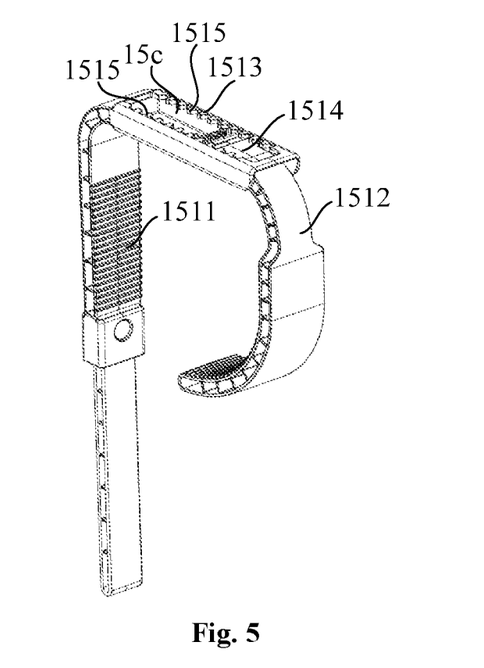
FIG. 5 schematically illustrates a stereogram of a hook component of the pool cleaner shown in FIG. 1.

With reference to FIG. 5, in order to achieve the movable connection mentioned above, the hook component 15 may be configured as follows.

A sliding chute 15c may be disposed on the third connection portion 1513, and the sliding chute 15c extends along a direction from the first hook leg portion 1511 to the second hook leg portion 1512.

The second hook leg portion 1512 may include an extension portion 1514 slidably inserted into the sliding chute 15c. When the extension portion 1514 is operated to slide within the sliding chute 15c, a space between the first hook leg portion 1511 and the second hook leg portion 1512 can be adjusted. Two rows of protuberances 1515 are respectively disposed on two side walls of the sliding chute 15c, when the extension portion 1514 are moved in the sliding chute 15c to any position, the two rows of protuberances 1515 can be stuck in the extension portion 1514, so that a distance between the first hook leg portion 1511 and the second hook leg portion 1512 can be maintained at a desired value.

Figure 6:
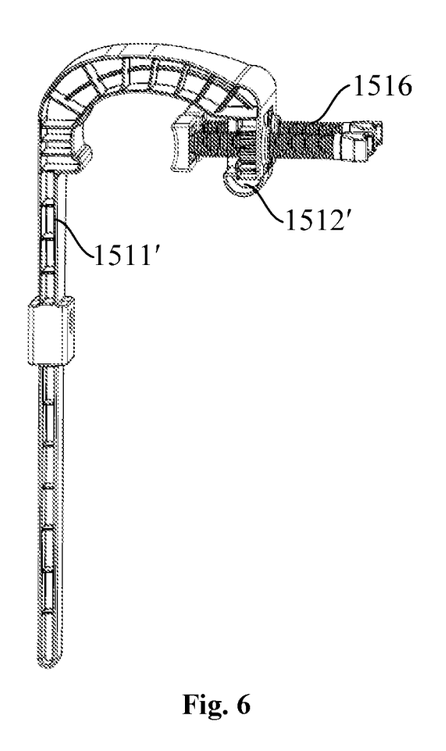
FIG. 6 schematically illustrates a stereogram of a hook component of the pool cleaner according to another embodiment of the present disclosure.

In another embodiment, referring to FIG. 6, a thread hole (not visible, since a fastener 1516 is inserted through the thread hole) is disposed on the second hook leg portion 1512', the second hook legs portion 1512' is provided with the fastener 1516 and the fastener 1516 is coupled with the thread hole by a screw-thread fit. When the fastener 1516 is screwed, the fastener 1516 can be moved toward or away from the first hook leg portion 1511'. When the fastener 1516 is moved toward the first hook leg portion 1511', a distance between the fastener 1516 and the first hook leg portion 1511' is shortened, and the second hook leg portion 1512' and the first hook leg portion 1511 clamp a thin pool wall together via the fastener 1516. On the contrary, when the fastener 1516 is moved away from the first hook leg portion 1511', a distance between the fastener 1516 and the first hook leg portion 1511' is increasing, and the fastener 1516 and the first hook leg portion 1511' clamp a thick pool wall together. Specifically, the fastener 1516 may be a bolt.

In the present embodiment, the hook portion 151 can be firmly clamped to a pool wall via the fastener 1516, so that the pool cleaner can keep stable during operation.

Figure 7:
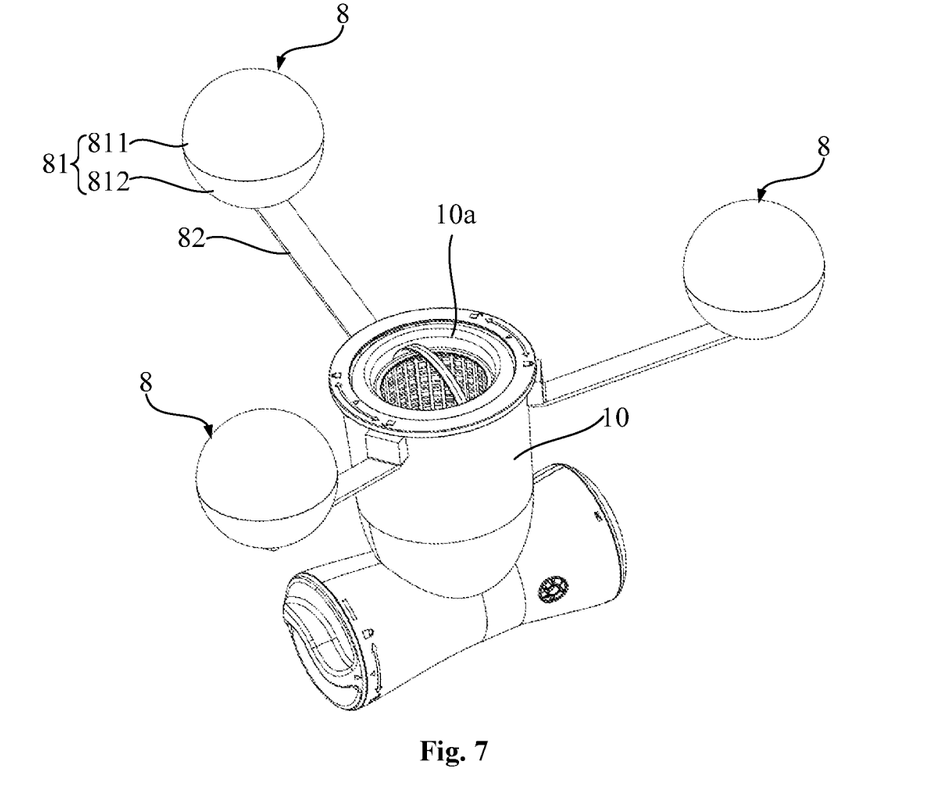
FIG. 7 schematically illustrates a stereogram of a pool cleaner with a floating component according to an embodiment of the present disclosure.

Referring to FIG. 7, the pool cleaner in the present disclosure may further include a floating component 8 which is connected with the first housing 10 and configured to keep the pool cleaner floating on water, and the first water inlet 10a is at least flush with the water surface or slightly lower than the water surface, so that even in a deep water pool, the pool cleaner can still play an effective filter and cleaning effect.

In some embodiments, the floating component 8 may include a floating portion 81 and a connection rod 82, where two ends of the connection rod 82 are respectively connected with the floating portion 81 and the first housing 10, and the floating portion 81 is filled with a foam material.

In some embodiments, the floating portion 81 may include a first float housing 811 and a second float housing 812. The first float housing 811 and the second float housing 812 are connected together to define a floating chamber (not shown), and a floating material (not shown) is disposed in the floating chamber. Both the first float housing 811 and the second float housing 812 are hemisphere-shaped, the first float housing 811 and the second float housing 812 are connected together to form a hollow sphere, and the hollow sphere is filled with the floating material. In some embodiments, there may be three floating components 8. In other embodiment, there may be other quantity of the floating component 8 which depends on a buoyancy to be achieved.

Although the present disclosure is disclosed as above, the present disclosure is not limited thereto. Any person skilled in the art will be able to make various changes and modifications without departing from the scope of the present disclosure, and therefore the scope of the present disclosure should be limited by the scope of the claims.

What is claimed is:

1. A pool cleaner, comprising:
    a first filter assembly comprising:
        a first housing defining a first chamber, where the first housing is provided with a first water inlet and a first water outlet; and
        a first filter device disposed in the first chamber configured to perform a first filtration to water from the first water inlet; and
    a second filter assembly comprising:
        a second housing defining a second chamber, where the second housing is provided with a second water inlet, and the second water inlet is connected with the first water outlet; and
        a second filter device disposed in the second chamber configured to perform a second filtration to the first filtered water;
    wherein the first housing is detachably connected with the second housing; and
    wherein a bottom portion of the first housing is detachably connected with a side wall of the second housing via a first connector.

2. The pool cleaner according to claim 1, wherein the first water outlet is positioned at the bottom portion of the first housing; and
    the first connector comprises:
        a first connection portion, protruding out of the side wall of the second housing, inserted through the first water outlet and extending into the first chamber, where the first connection portion is provided with a first through hole as the second water inlet; and
        a first limit portion, disposed in the first chamber, surrounding an outside of the first connection portion and coupled with the first connection portion by a screw-thread fit.

3. The pool cleaner according to claim 1, wherein at least an edge portion of the bottom portion of the first housing fits the side wall of the second housing along a circumferential direction of the first housing.

4. The pool cleaner according to claim 1, wherein diameters of filter holes of the first filter device are greater than diameters of filter holes of the second filter device.

5. The pool cleaner according to claim 1, further comprising:

a water pump, communicated with the second chamber; and
    a third housing defining a third chamber configured to receive the water pump.

6. The pool cleaner according to claim 5, wherein the water pump is provided with a water inlet pipe and a water outlet pipe; and
    the water pump is communicated with the second chamber via the water inlet pipe, and the second filtered water flows into the water pump via the water inlet pipe and is drained out of the third chamber via the water outlet pipe.

7. The pool cleaner according to claim 6, wherein an outlet is disposed on the third housing, and water flowing from the water outlet pipe flows out of the third chamber through the outlet.

8. The pool cleaner according to claim 7, wherein at least one drain hole is disposed on the third housing, and the at least one drain hole is spaced from the outlet.

9. The pool cleaner according to claim 6, wherein the second housing and the third housing are integrally formed, the second chamber and the third chamber are separated by a separator, a second through hole is disposed on the separator, and the water inlet pipe is inserted through the second through hole and extends into the second chamber.

10. The pool cleaner according to claim 9, wherein the water inlet pipe ls detachably connected with the separator via a second connector.

11. The pool cleaner according to claim 10, wherein the second connector comprises:
    a second connection portion, disposed on the water inlet pipe and inserted through the second through hole and extending into the second chamber; and
    a second limit portion, disposed in the second chamber, surrounding an outside of the second connection portion and coupled with the second connection portion by a screw-thread fit.

12. The pool cleaner according to claim 5, wherein the first housing, the second housing and the third housing are arranged in a way to make:
    a water flow direction from the first chamber to the second chamber is perpendicular to a water flow direction from the second chamber to the third chamber.

13. The pool cleaner according to claim 5, further comprising a first end cap and a second end cap;
    wherein the first end cap is coupled to an end of the second housing away from the third housing, and the second end cap is coupled to an end of the third housing away from of the second housing.

14. The pool cleaner according to claim 6, wherein the second filter device comprises a filter element configured to perform the second filtration to the first filtered water;
    the second chamber is partitioned to a first inner chamber and a second inner chamber by the filter element; and
    the second water inlet is communicated with the first inner chamber, the second inner chamber is communicated with the water pump, and the first filtered water firstly flows into the first inner chamber and then flows into the second inner chamber through the filter element.

15. The pool cleaner according to claim 14, wherein the filter element comprises a filter cartridge, a space between the filter cartridge and the second housing is the first inner chamber, and a space inside the filter cartridge is the second inner chamber; and
    the water inlet pipe is at least partially positioned within the second inner chamber.

16. The pool cleaner according to claim 1, wherein the first filter device comprises a filter basket, and the filter basket is provided with a plurality of filter holes and configured to perform the first filtration.

17. The pool cleaner according to claim 16, wherein the first filter assembly further comprises a floating weir, and the floating weir comprises:
   a hollow tubular structure; and
   a flange, having an annular shape and a cross section in a downward curved arc shape, and an outer edge of the flange being connected with an upper end of the hollow tubular structure;
   where the hollow tubular structure is disposed between the first chamber and the filter basket.

18. The pool cleaner according to claim 17, wherein the first filter assembly further comprises a limit portion and an outer edge of the limit portion is connected with the first water inlet to limit the floating weir within the first chamber.

19. The pool cleaner according to claim 18, wherein the first filter device further comprises a filter pad disposed within the filter basket; and
   the filter pad has a porous structure, and diameters of holes in the filter pad are smaller than diameters of the plurality of filter holes of the filter basket.

20. The pool cleaner according to claim 1, further comprising a hook component connected with the first housing.

21. The pool cleaner according to claim 20, wherein the hook component comprises:
   a base, connected with a side wall of the first housing; and
   a hook portion, one end of the hook portion being connected with the base.

22. The pool cleaner according to claim 21, wherein the hook portion is configured to move on the base to change a mounting position of the hook portion; and
   at the mounting position, the hook portion is fixedly connected with the base.

23. The pool cleaner according to claim 22, wherein the hook portion comprises:
   a first hook leg portion, a second hook leg portion and a third connection portion, where two ends of the third connection portion are respectively connected with the first hook leg portion and the second hook leg portion, at least one of the first hook leg portion and the second hook leg portion is detachably connected with the third connection portion, and the hook portion is connected with the base via the first hook leg portion and configured to move on the base to change the mounting position.

24. The pool cleaner according to claim 23, wherein at least one of the first hook leg portion and the second hook leg portion is movably connected with the third connection to change a distance between the first hook leg portion and the second hook leg portion.

25. The pool cleaner according to claim 23, wherein the second hook leg portion is provided with a fastener.

26. The pool cleaner according to claim 1, further comprising:
   a floating component, connected with the first housing configured to keep the pool cleaner floating on a water surface.

27. The pool cleaner according to claim 26, wherein the floating component comprises a floating portion and a connection rod, two ends of the connection rod are connected with the floating portion and the first housing respectively, and the floating portion is filled with a foam material.

28. A pool cleaner, comprising:
   a first filter assembly comprising:
      a first housing defining a first chamber, where the first housing is provided with a first water inlet and a first water outlet; and
      a first filter device disposed in the first chamber configured to perform a first filtration to water from the first water inlet; and
   a second filter assembly comprising:
      a second housing defining a second chamber, where the second housing is provided with a second water inlet, and the second water inlet is connected with the first water outlet; and
      a second filter device disposed in the second chamber configured to perform a second filtration to the first filtered water;
   wherein the first housing is detachably connected with the second housing;
   a water pump, communicated with the second chamber;
   a third housing defining a third chamber configured to receive the water pump;
   wherein the water pump is provided with a water inlet pipe and a water outlet pipe; and
   the water pump is communicated with the second chamber via the water inlet pipe, and the second filtered water flows into the water pump via the water inlet pipe and is drained out of the third chamber via the water outlet pipe.

29. The pool cleaner according to claim 28, wherein an outlet is disposed on the third housing, and water flowing from the water outlet pipe flows out of the third chamber through the outlet.

30. The pool cleaner according to claim 29, wherein at least one drain hole is disposed on the third housing, and the at least one drain hole is spaced from the outlet.

31. The pool cleaner according to claim 28, wherein the second housing and the third housing are integrally formed, the second chamber and the third chamber are separated by a separator, a second through hole is disposed on the separator, and the water inlet pipe is inserted through the second through hole and extends into the second chamber.

32. The pool cleaner according to claim 31, wherein the water inlet pipe is detachably connected with the separator via a second connector.

33. The pool cleaner according to claim 32, wherein the second connector comprises:
   a second connection portion, disposed on the water inlet pipe and inserted through the second through hole and extending into the second chamber; and
   a second limit portion, disposed in the second chamber, surrounding an outside of the second connection portion and coupled with the second connection portion by a screw-thread fit.

34. The pool cleaner according to claim 28, wherein the first housing, the second housing and the third housing are arranged in a way to make:
   a water flow direction from the first chamber to the second chamber is perpendicular to a water flow direction from the second chamber to the third chamber.

35. The pool cleaner according to claim 28, further comprising a first end cap and a second end cap;
   wherein the first end cap is coupled to an end of the second housing away from the third housing, and the second end cap is coupled to an end of the third housing away from of the second housing.

36. The pool cleaner according to claim 28, wherein the second filter device comprises a filter element configured to perform the second filtration to the first filtered water;

the second chamber is partitioned to a first inner chamber and a second inner chamber by the filter element; and the second water inlet is communicated with the first inner chamber, the second inner chamber is communicated with the water pump, and the first filtered water firstly flows into the first inner chamber and then flows into the second inner chamber through the filter element.

37. The pool cleaner according to claim 36, wherein the filter element comprises a filter cartridge, a space between the filter cartridge and the second housing is the first inner chamber, and a space inside the filter cartridge is the second inner chamber; and the water inlet pipe is at least partially positioned within the second inner chamber.

38. A pool cleaner, comprising:
a first filter assembly comprising:
 a first housing defining a first chamber, where the first housing is provided with a first water inlet and a first water outlet; and
 a first filter device disposed in the first chamber configured to perform a first filtration to water from the first water inlet; and
a second filter assembly comprising:
 a second housing defining a second chamber, where the second housing is provided with a second water inlet, and the second water inlet is connected with the first water outlet; and
 a second filter device disposed in the second chamber configured to perform a second filtration to the first filtered water;
wherein the first housing is detachably connected with the second housing;
wherein the first filter device comprises a filter basket, and the filter basket is provided with a plurality of filter holes and configured to perform the first filtration;
wherein the first filter assembly further comprises a floating weir, and the floating weir comprises:
 a hollow tubular structure; and
 a flange, having an annular shape and a cross section in a downward curved arc shape, and an outer edge of the flange being connected with an upper end of the hollow tubular structure; and
 where the hollow tubular structure is disposed between the first chamber and the filter basket.

39. The pool cleaner according to claim 38, wherein the first filter assembly further comprises a limit portion and an outer edge of the limit portion is connected with the first water inlet to limit the floating weir within the first chamber.

40. The pool cleaner according to claim 39, wherein the first filter device further comprises a filter pad disposed within the filter basket; and the filter pad has a porous structure, and diameters of holes in the filter pad are smaller than diameters of the plurality of filter holes of the filter basket.

41. A pool cleaner, comprising:
a first filter assembly comprising:
 a first housing defining a first chamber, where the first housing is provided with a first water inlet and a first water outlet; and
 a first filter device disposed in the first chamber configured to perform a first filtration to water from the first water inlet; and
a second filter assembly comprising:
 a second housing defining a second chamber, where the second housing is provided with a second water inlet, and the second water inlet is connected with the first water outlet; and
 a second filter device disposed in the second chamber configured to perform a second filtration to the first filtered water;
wherein the first housing is detachably connected with the second housing; and
a hook component connected with the first housing.

42. The pool cleaner according to claim 41, wherein the hook component comprises:
a base, connected with a side wall of the first housing; and
a hook portion, one end of the hook portion being connected with the base.

43. The pool cleaner according to claim 42, wherein the hook portion is configured to move on the base to change a mounting position of the hook portion; and at the mounting position, the hook portion is fixedly connected with the base.

44. The pool cleaner according to claim 43, wherein the hook portion comprises:
a first hook leg portion, a second hook leg portion and a third connection portion, where two ends of the third connection portion are respectively connected with the first hook leg portion and the second hook leg portion, at least one of the first hook leg portion and the second hook leg portion is detachably connected with the third connection portion, and the hook portion is connected with the base via the first hook leg portion and configured to move on the base to change the mounting position.

45. The pool cleaner according to claim 44, wherein at least one of the first hook leg portion and the second hook leg portion is movably connected with the third connection to change a distance between the first hook leg portion and the second hook leg portion.

46. The pool cleaner according to claim 44, wherein the second hook leg portion is provided with a fastener.

47. A pool cleaner, comprising:
a first filter assembly comprising:
 a first housing defining a first chamber, where the first housing is provided with a first water inlet and a first water outlet; and
 a first filter device disposed in the first chamber configured to perform a first filtration to water from the first water inlet; and
a second filter assembly comprising:
 a second housing defining a second chamber, where the second housing is provided with a second water inlet, and the second water inlet is connected with the first water outlet; and
 a second filter device disposed in the second chamber configured to perform a second filtration to the first filtered water;
wherein the first housing is detachably connected with the second housing; and
a floating component, connected with the first housing configured to keep the pool cleaner floating on a water surface.

48. The pool cleaner according to claim 47, wherein the floating component comprises a floating portion and a connection rod, two ends of the connection rod are connected with the floating portion and the first housing respectively, and the floating portion is filled with a foam material.

* * * * *